United States Patent
Mo et al.

(10) Patent No.: US 12,500,504 B2
(45) Date of Patent: Dec. 16, 2025

(54) PHASE-SHIFTED FULL-BRIDGE CONVERTER, CONTROL METHOD AND DEVICE THEREOF, AND MEDIUM

(71) Applicant: ALTENERGY POWER SYSTEM INC., Zhejiang (CN)

(72) Inventors: Yunjie Mo, Zhejiang (CN); Yongchun Yang, Zhejiang (CN); Biaojie Qi, Zhejiang (CN); Yuhao Luo, Zhejiang (CN)

(73) Assignee: ALTENERGY POWER SYSTEM INC., Zhejiang (CN)

( * ) Notice: Subject to any disclaimer, the term of this patent is extended or adjusted under 35 U.S.C. 154(b) by 255 days.

(21) Appl. No.: 18/279,065

(22) PCT Filed: Aug. 2, 2021

(86) PCT No.: PCT/CN2021/109955
§ 371 (c)(1),
(2) Date: Aug. 27, 2023

(87) PCT Pub. No.: WO2022/205718
PCT Pub. Date: Oct. 6, 2022

(65) Prior Publication Data
US 2024/0146204 A1 May 2, 2024

(30) Foreign Application Priority Data

Mar. 29, 2021 (CN) .......................... 202110331837.4

(51) Int. Cl.
*H02M 1/00* (2006.01)
*H02M 3/00* (2006.01)
*H02M 3/335* (2006.01)

(52) U.S. Cl.
CPC ....... *H02M 1/0043* (2021.05); *H02M 1/0058* (2021.05); *H02M 3/01* (2021.05); *H02M 3/33573* (2021.05)

(58) Field of Classification Search
CPC .... H02M 3/01; H02M 3/335; H02M 3/33569; H02M 3/33573; H02M 3/33592; H02M 1/0043; H02M 1/0058; H02M 1/083
See application file for complete search history.

(56) References Cited

U.S. PATENT DOCUMENTS

| | | |
|---|---|---|
| 9,882,389 B2 | 1/2018 | Pahlevaninezhad et al. |
| 10,574,129 B2 | 2/2020 | Chandrasekaran |

(Continued)

FOREIGN PATENT DOCUMENTS

| | | |
|---|---|---|
| CN | 109687719 A | 4/2019 |
| CN | 110768535 A | 2/2020 |

(Continued)

OTHER PUBLICATIONS

European Search Report issued on Nov. 21, 2024 for the European counterpart application No. 21934362.1.

(Continued)

*Primary Examiner* — Gary L Laxton
(74) *Attorney, Agent, or Firm* — Yue (Robert) Xu; Apex Attorneys at Law, LLP (57) ABSTRACT

A phase-shifted full-bridge converter, and a method and a device for controlling the phase-shifted full-bridge converter are provided. The method includes: acquiring a current currently inputted to the phase-shifted full-bridge converter; determining, based on a correspondence between inputted currents and operation modes, an operation mode corresponding to the current currently inputted to the phase-shifted full-bridge converter; and acquiring, from maximum power point tracking in the determined operation mode, a (Continued)

phase angle for the phase-shifted full-bridge converter and a switching frequency of a switch transistor in the phase-shifted full-bridge converter, to control the switch transistor to operate based on the phase angle and the switching frequency.

9 Claims, 6 Drawing Sheets

(56) References Cited

U.S. PATENT DOCUMENTS

| | | | |
|---|---|---|---|
| 2015/0180345 A1* | 6/2015 | Frost | H02M 3/3376 363/21.02 |
| 2017/0279375 A1 | 9/2017 | Rodriguez | |

FOREIGN PATENT DOCUMENTS

| | | |
|---|---|---|
| CN | 111277145 A | 6/2020 |
| CN | 112332674 A | 2/2021 |
| CN | 112737350 A | 4/2021 |
| JP | 2008040664 A | 2/2008 |

OTHER PUBLICATIONS

Sadhukhan Archak et al: "Maximum power point tracking of SPV Array using phase-shifted PWM DC-DC Converter", 2020 IEEE Calcutta Conference(CALCON), IEEE Feb. 28, 2020 (Feb. 28, 2020), pp. 516-520, XP033776578,DOI:10.1109/CALCON49167. 2020.9106528 [retrieved on Jun. 1, 2020] *the whole document*.
Tayebi Seyed Milad et al:"Dual-Input Single-Resonant Tank LLC Converter with phase shift Control for PV application", IEEE transactions on Industry applications, IEEE Service Center, Piscataway,NJ,US, vol. 55, No. 2,Mar. 1, 2019 ( Mar. 1, 2019 ) pp. 1729-1739 , XP011714378, ISSN:0093-9994,DOT:10.1109/TIA. 2018.2883015[retrieved on Mar. 13, 2019] *the whole document*.
Deshbhratar R G et al:"Analysis and design of solar power system interface utility using ZVS converter" , 2017 international conference on energy , communication , Data analytics and soft computing ( ICECDS),IEEE,Aug. 1, 2017 ( Aug. 1, 2017 ) pp. 1185-1192 , XP033359937,DOT:10.1109/ICECDS.2017.8389628 [retrieved on Jun. 19, 2018] p. 1186-1189 ; figure 2.
International Search Report for PCT/CN2021/109955 mailed Dec. 31, 2021, ISA/CN.
Umme Mumtahina, PV Module Integrated LLC Resonant Converter with an Extended Input Voltage Range 2017 Australasian Universities Power Engineering Conference (AUPEC) Nov. 22, 2017 ISSN: 2474-1507, sections I-III.

* cited by examiner

PHASE-SHIFTED FULL-BRIDGE CONVERTER, CONTROL METHOD AND DEVICE THEREOF, AND MEDIUM

The present application is a national phase application of PCT international patent application No. PCT/CN2021/109955, filed on Aug. 2, 2021 which claims priority to Chinese Patent Application No. 202110331837.4, titled "PHASE-SHIFTED FULL-BRIDGE CONVERTER, METHOD AND DEVICE FOR CONTROLLING THE SAME, AND MEDIUM", filed on Mar. 29, 2021 with the China National Intellectual Property Administration, all of which are incorporated herein by reference in their entireties.

FIELD

The present application relates to the field of power conversion, and in particular to a phase-shifted full-bridge converter, a method and a device for controlling the phase-shifted full-bridge converter, and a medium.

BACKGROUND

The photovoltaic power generation system converts solar energy into electric energy, and includes a photovoltaic module and an inverter. In order to extract maximum power from the photovoltaic module, a switch transistor in a DCDC converter in the inverter is controlled so that the photovoltaic power generation system operates following maximum power point tracking.

Power extracted from the photovoltaic module varies quickly as the sunlight varies. For the maximum power point tracking applied at present, the switch transistor in the DCDC converter is controlled in a constant cycle, that is, switched on for a constant period of time, and the phase is shifted at a constant time instant, failing to adapt to the varying current inputted into the inverter. Therefore, it usually spends several milliseconds or even seconds on finishing one cycle in order to stabilize the power, which likely causes the inverter to operate unstably or even results in a failure in the maximum power point tracking.

In view of the above, it is urgent for those skilled in the art to find a solution for controlling a phase-shifted full-bridge converter in order to improve efficiency and stability for the maximum power point tracking.

SUMMARY

A phase-shifted full-bridge converter and a method for controlling the phase-shifted full-bridge converter are provided, so as to control a switch transistor in the phase-shifted full-bridge converter in a mode that adapts to the varying current inputted to the phase-shifted full-bridge converter. Therefore, a rapid change in the current inputted to the phase-shifted full-bridge converter can be responded timely, thereby improving efficiency and stability for maximum power point tracking and further meeting requirements of the system.

A method for controlling a phase-shifted full-bridge converter is provided according to the present disclosure, in order to solve the above technical problem. The method includes: acquiring a current currently inputted to the phase-shifted full-bridge converter; determining, based on a correspondence between inputted currents and operation modes, an operation mode corresponding to the current currently inputted to the phase-shifted full-bridge converter; and acquiring, from maximum power point tracking in the determined operation mode, a phase angle for the phase-shifted full-bridge converter and a switching frequency of a switch transistor in the phase-shifted full-bridge converter, to control the switch transistor to operate based on the phase angle and the switching frequency.

Preferably, the determining, based on a correspondence between inputted currents and operation modes, an operation mode corresponding to the current currently inputted to the phase-shifted full-bridge converter includes: controlling, in a case that the current currently inputted to the phase-shifted full-bridge converter is greater than a first current threshold, the switch transistor to operate in a first operation mode; controlling, in a case that the current currently inputted to the phase-shifted full-bridge converter is greater than a second current threshold and less than the first current threshold, the switch transistor to operate in a second operation mode; controlling, in a case that the current currently inputted to the phase-shifted full-bridge converter is greater than a third current threshold and less than the second current threshold, the switch transistor to operate in a third operation mode; and controlling, in a case that the current currently inputted to the phase-shifted full-bridge converter is less than the third current threshold, the switch transistor to operate in a fourth operation mode.

Preferably, the first current threshold depends on a preset minimum switching frequency. The second current threshold depends on a preset maximum switching frequency. The third current threshold depends on the preset maximum switching frequency and a preset maximum phase angle.

In an embodiment, in the first operation mode, the switching frequency is equal to the minimum switching frequency, and the phase angle is negatively correlated with the current currently inputted to the phase-shifted full-bridge converter. In the second operation mode, the phase angle is constant, and the switching frequency is negatively correlated with the current currently inputted to the phase-shifted full-bridge converter. In the third operation mode, the switching frequency is equal to the maximum switching frequency, and the phase angle is negatively correlated with the current currently inputted to the phase-shifted full-bridge converter. In the fourth operation mode, the phase angle is constant, and the switch transistor has an operation cycle and a nonoperation cycle, where the operation cycle and the nonoperation cycle depend on the current currently inputted to the phase-shifted full-bridge converter.

In an embodiment, the operation cycle is equal to an entire switching period of the switch transistor in the fourth operation mode.

In an embodiment, the method for controlling a phase-shifted full-bridge converter further includes: controlling, in response to a starting instruction, two switch transistors on a front bridge arm of the phase-shift full-bridge converter to be switched on alternately; and controlling, in response to the starting instruction, two switch transistors on a rear bridge arm of the phase-shift full-bridge converter to be switched on alternately.

A device for controlling a phase-shifted full-bridge converter is provided according to the present disclosure, in order to solve the above technical problem. The device includes an acquisition module, a search module and a control module. The acquisition module is configured to acquire a current currently inputted to the phase-shifted full-bridge converter. The determination module is configured to configured to determine, based on a correspondence between inputted currents and operation modes, an operation mode corresponding to the current currently inputted to the phase-shifted full-bridge converter. The control module is configured to acquire, from maximum power point tracking in the determined operation mode, a phase angle for the phase-shifted full-bridge converter and a switching frequency of a switch transistor in the phase-shifted full-bridge converter, to control the switch transistor based on the phase angle and the switching frequency.

A device for controlling a phase-shifted full-bridge converter is provided according to the present disclosure, in order to solve the above technical problem. The device includes a memory and a processor. The memory is configured to store a computer program. The processor is configured to execute the computer program to implement the method for controlling a phase-shifted full-bridge converter.

A computer-readable storage medium is further provided according to the present disclosure, in order to solve the above technical problem. The computer-readable storage medium stores a computer program that, when executed by a processor, implements the method for controlling a phase-shifted full-bridge converter.

A phase-shifted full-bridge converter is further provided according to the present disclosure, in order to solve the above technical problem. The phase-shifted full-bridge converter includes the device for controlling a phase-shifted full-bridge converter, a primary full-bridge circuit, a transformer, a first inductor, a second inductor, a third inductor, a first diode, a second diode, a first capacitor and a second capacitor. A first output terminal of the primary full-bridge circuit is connected to a first terminal of the first inductor. A second terminal of the first inductor is connected to a first terminal of a primary winding of the transformer. A second output terminal of the primary full-bridge circuit is connected to a second terminal of the primary winding of the transformer. The second inductor is connected in parallel with the primary winding of the transformer. A first terminal of a secondary winding of the transformer is connected to a first terminal of the third inductor. A second terminal of the third inductor is connected to a first terminal of the first capacitor and a first terminal of the second capacitor. A second terminal of the first capacitor is connected to a cathode of the first diode. An anode of the first diode is connected to a cathode of the second diode. A second terminal of the secondary winding of the transformer is connected to the cathode of the second diode. An anode of the second diode is connected to a second terminal of the second capacitor.

With the method for controlling a phase-shifted full-bridge converter according to the present disclosure, the current currently inputted to the phase-shifted full-bridge converter is acquired, and the correspondence between inputted currents and operation modes is searched for the operation mode corresponding to the current currently inputted to the phase-shifted full-bridge converter. The phase angle for the phase-shift full-bridge converter and the switching frequency of the switch transistor in the phase-shifted full-bridge converter in the determined operation mode are determined for the purpose of maximum power point tracking. The switch transistor is controlled based on the phase angle and the switching frequency. With the above technical solutions, the switch transistor in the phase-shifted full-bridge converter can be controlled in a mode that adapts to the varying current inputted to the phase-shifted full-bridge converter. Therefore, the rapid change in the current inputted to the phase-shifted full-bridge converter can be responded timely, thereby improving efficiency and stability for the maximum power point tracking and further meeting requirements of the system.

BRIEF DESCRIPTION OF THE DRAWINGS

In order to more clearly describe the embodiments of the present disclosure, drawings illustrating the embodiments are briefly described hereinafter. It is apparent that the drawings described below merely illustrate the embodiments of the present disclosure, and those skilled in the art may obtain other drawings based on the provided drawings without any creative effort.

DETAILED DESCRIPTION OF EMBODIMENTS

Technical solutions of embodiments of the present disclosure are described clearly and completely below in conjunction with the drawings of the embodiments of the present disclosure. Apparently, the embodiments described below are only some rather than all the embodiments of the present disclosure. Any other embodiments obtained by those skilled in the art based on the embodiments in the present disclosure without any creative effort fall within the protection scope of the present disclosure.

A phase-shifted full-bridge converter and a method for controlling the phase-shifted full-bridge converter are provided according to the present disclosure. A switch transistor in the phase-shifted full-bridge converter can be controlled in a mode that adapts to the varying current inputted to the phase-shifted full-bridge converter. In this way, a rapid change in the current inputted to the phase-shifted full-bridge converter can be responded timely, thereby improving efficiency and stability for the maximum power point tracking and further meeting requirements of the system.

Figure 1:
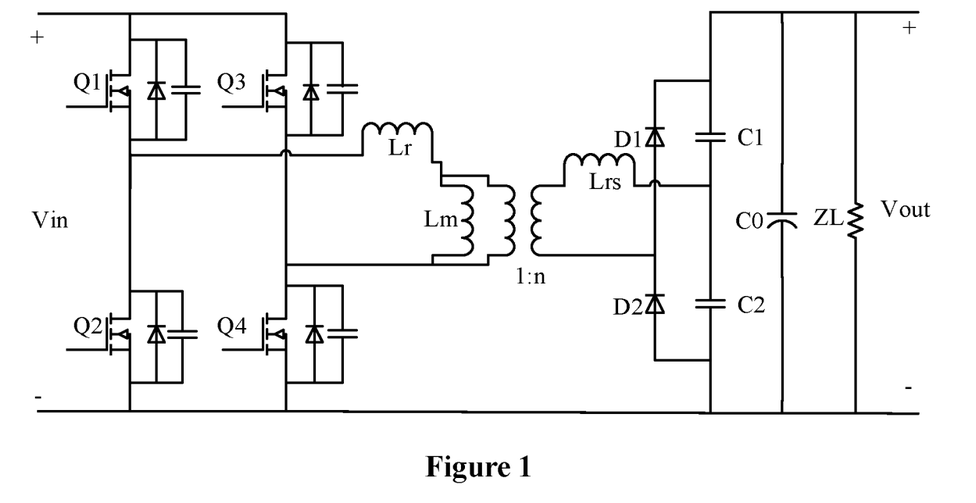
FIG. 1 is a circuit diagram illustrating a phase-shifted full-bridge converter according to an embodiment of the present disclosure.

In practice, a direct current voltage Vin from a direct current voltage source is inputted to the phase-shifted full-bridge converter. The direct current voltage source may be a photovoltaic module, a battery or the like. The phase-shifted full-bridge converter outputs a direct current bus voltage Vout. FIG. 1 is a circuit diagram illustrating the phase-shifted full-bridge converter according to an embodiment of the present disclosure. As illustrated in FIG. 1, the phase-shifted full-bridge converter includes a primary full-bridge circuit, a transformer, a first inductor Lr, a second inductor Lm, a third inductor Lrs, a first diode D1, a second diode D2, a first capacitor C1, and a second capacitor C2.

A first output terminal of the primary full-bridge circuit is connected to a first terminal of the first inductor Lr. A second terminal of the first inductor Lr is connected to a first terminal of a primary winding of the transformer. A second output terminal of the primary full-bridge circuit is connected to a second terminal of the primary winding of the transformer. The second inductor Lm is connected in parallel with the primary winding of the transformer. A first terminal of a secondary winding of the transformer is connected to a first terminal of the third inductor Lrs. A second terminal of the third inductor Lrs is connected to a first terminal of the first capacitor C1 and a first terminal of the second capacitor C2. A second terminal of the first capacitor C1 is connected to a cathode of the first diode D1. An anode of the first diode D1 is connected to a cathode of the second diode D2. A second terminal of the secondary winding of the transformer is connected to the cathode of the second diode D2. An anode of the second diode D2 is connected to a second terminal of the second capacitor C2.

The primary full-bridge circuit of the phase-shifted full-bridge converter includes a first switch transistor Q1, a second switch transistor Q2, a third switch transistor Q3 and a fourth switch transistor Q4. The switch transistor herein is a MOS transistor with a bulk diode and a bulk capacitor. An output end of the primary full-bridge circuit is connected to the primary winding of the transformer. The first inductor Lr in the primary winding serves as a leakage inductor Lr. The second inductor Lm in the primary winding serves as an excitation inductor Lm. The third inductor Lrs in the secondary winding of the transformer serves as a resonant inductor Lrs. The first capacitor C1 and the second capacitor C2 connected to the secondary winding each serve as a resonant capacitor. The first diode D1 and the second diode D2 connected to the secondary winding each serve as a rectifier diode.

In the phase-shifted full-bridge converter according to the present disclosure, the primary winding is controlled by a phase-shifted full-bridge with LC resonance, and the secondary winding is connected to a rectifier circuit with LC resonance. A phase angle is involved in controlling the primary full-bridge circuit, and therefore resonance occurs based on the leakage inductor Lr, and the bulk capacitors of the first switch transistor Q1, the second switch transistor Q2, the third switch transistor Q3 and the fourth switch transistor Q4. In this way, the switch transistors connected to the primary winding are switched when an immediate voltage is zero, that is, zero voltage switching (ZVS). Due to the phase angle, the voltage leads the current in phase, and therefore the output from the secondary winding is switched when immediate current is zero, that is, zero current switching (ZCS). In this way, the rectifier diode can be soft-switched when immediate current is zero.

In view of the above, there is obtained a relationship between the inputted current Iin of the phase-shifted full-bridge converter and the inputted voltage Vin, the outputted voltage Vout, inductance of the leakage inductor Lr, inductance of the excitation inductor Lm, a turn ratio n for the transformer, that is, a ratio of the number of turns in the primary winding of the transformer to the number of turns in the secondary winding of the transformer, capacitance C of the resonant capacitors C1 and C2, a switching period T and an effective period of time Ton during which the phase-shifted full-bridge converter is on. The relationship is expressed as $Iin = I_1(Vin, Vout, Lr, Lm, n, C, T, Ton)$.

It should be noted that for a certain hardware structure, the inductance of the leakage inductor Lr, the inductance of the excitation inductor Lm, the ratio n for the transformer, and the capacitance C of the resonance capacitors C1 and C2 are constant. Therefore, the above expression may be simplified as $Iin = I_2(Vin, Vout, T, Ton)$.

A relationship between the effective period of time Ton and the inputted voltage Vin, the outputted voltage Vout, the inductance of the leakage inductor Lr, the inductance of the excitation inductor Lm, the turn ratio n for the transformer, and the switching period T is expressed as $Ton = ton(Vout/Vin, Lr, Lm, n, T)$.

Similarly, for a certain hardware structure, the inductance of the leakage inductor Lr, the inductance of the excitation inductor Lm, and the turn ratio n for the transformer are constant. Therefore, the above expression may be simplified as: $Ton = ton(Vout/Vin, T)$.

The voltage leads the current by a period of time $Tps = T/2 - Ton = Tps(Vout/Vin, T)$ in time.

The inputted current is expressed as $Iin = I(Vin, Vout, Tps/T, T)$.

A sum of Ton and Tps is equal to a half of the switching period T. Tps indicates a difference between a time instant at which a switch transistor in a front bridge arm is switched and a time instant at which a switch transistor in a rear bridge arm is switched. Tps/T represents the phase angle.

In the maximum power point tracking, the inputted voltage Vin and the outputted voltage Vout are constant at a certain power point, and therefore the inputted current Vin is related to only T or Tps.

The present disclosure is described in more detail below in combination with the drawings and the embodiments, so that those skilled in the art can better understand the solutions of the present disclosure.

Figure 2:
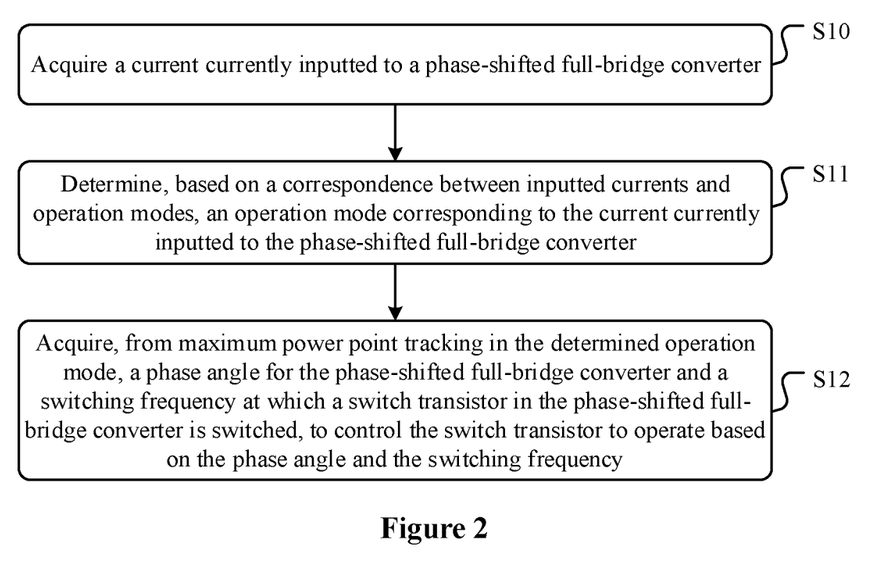
FIG. 2 is a flowchart illustrating a method for controlling the phase-shifted full-bridge converter according to an embodiment of the present disclosure.

FIG. 2 is a flowchart illustrating a method for controlling the phase-shifted full-bridge converter according to an embodiment of the present disclosure. As illustrated in FIG. 2, the method includes the following steps S10 to S12.

In step S10, a current currently inputted to the phase-shifted full-bridge converter is acquired.

It should be noted that the voltage Vin and the current Iin inputted to the phase-shifted full-bridge converter, and the voltage Vout outputted by the phase-shifted full-bridge converter may be acquired by an ADC sampling circuit. It should be understood that the current Iin inputted to the phase-shifted full-bridge converter is illustrated here. In other embodiments, a current Iout outputted by the phase-shifted full-bridge converter is illustrated, which is not limited herein.

In step S11, a correspondence between inputted currents and operation modes is searched for an operation mode corresponding to the current currently inputted to the phase-shifted full-bridge converter.

In step S12, it is acquired, from maximum power point tracking in the determined operation mode, a phase angle for the phase-shifted full-bridge converter and a switching frequency of a switch transistor in the phase-shifted full-bridge converter, and the switch transistor is controlled based on the phase angle and the switching frequency.

In practice, in response to a starting instruction, two switch transistors in the front bridge arm of the phase-shift full-bridge converter are switched on alternately, and two switch transistors in the rear arm are switched on alternately. The phase-shift full-bridge converter operates in one cycle as follows. The first switch transistor Q1 and the fourth switch transistor Q4 are simultaneously switched on. When Ton elapses, the first switch transistor Q1 is switched off.

When a deadtime Tdt elapses, the second switch transistor Q2 is switched on with ZVS. When Tps elapses, the fourth switch transistor Q4 is switched off with ZCS. When Tdt elapses, the third switch transistor Q3 is switched on with ZVS. When Ton during which both the second switch transistor Q2 and the third switch transistor Q3 are on elapses, the second switch transistor Q2 is switched off. When Tdt elapses, the first switch transistor Q1 is switched on with ZVS. When Tps elapses, the third switch transistor Q3 is switched off with VCS. When Tdt elapses, the fourth switch transistor Q4 is switched on with ZVS. Then, the first switch transistor Q1 and the fourth switch transistor Q4 are simultaneously on again.

In the present operation mode, the phase angle for the phase-shifted full-bridge converter and the switching frequency of the switch transistor in the phase-shifted full-bridge converter are determined for the maximum power point tracking, so as to adapt to the current currently inputted to the phase-shifted full-bridge converter. Accordingly, T, Ton and Tps are modified, so as to control the switch transistors.

With the method for controlling a phase-shifted full-bridge converter according to the present disclosure, the current currently inputted to the phase-shifted full-bridge converter is acquired, and the correspondence between inputted currents and operation modes is searched for the operation mode corresponding to the current currently inputted to the phase-shifted full-bridge converter. The phase angle for the phase-shift full-bridge converter and the switching frequency of the switch transistor in the phase-shifted full-bridge converter in the determined operation mode are determined for the purpose of maximum power point tracking. The switch transistor is controlled based on the phase angle and the switching frequency. With the above technical solutions, the switch transistor in the phase-shifted full-bridge converter can be controlled in a mode that adapts to the varying current inputted to the phase-shifted full-bridge converter. Therefore, the rapid change in the current inputted to the phase-shifted full-bridge converter can be responded timely, thereby improving efficiency and stability for the maximum power point tracking and further meeting requirements of the system.

Based on the above embodiments, step S11 in a preferred embodiment includes: controlling, in a case that the current currently inputted to the phase-shifted full-bridge converter is greater than a first current threshold, the switch transistor to operate in a first operation mode; controlling, in a case that the current currently inputted to the phase-shifted full-bridge converter is greater than a second current threshold and less than the first current threshold, the switch transistor to operate in a second operation mode; controlling, in a case that the current currently inputted to the phase-shifted full-bridge converter is greater than a third current threshold and less than the second current threshold, the switch transistor to operate in a third operation mode; and controlling, in a case that the current currently inputted to the phase-shifted full-bridge converter is less than the third current threshold, the switch transistor to operate in a fourth operation mode.

The first current threshold depends on a minimum switching frequency. The second current threshold depends on a maximum switching frequency. The third current threshold depends on the maximum switching frequency and a maximum phase angle.

In practice, the phase-shifted full-bridge converter operates in an initial mode when starting the power point tracking. The initial mode may be any of the above operation modes, e.g., the third operation mode. A minimum switching period (corresponding to the maximum switching frequency) is set to Tmin and the maximum Tps is set to Tps max. The phase-shifted full-bridge converter operates with the maximum power point tracking in the initial mode in the existing manners, which are not described in detail herein. The voltage Vin and the current Iin inputted to the phase-shifted full-bridge converter are determined, and then a subsequent operation mode is determined based on the current Iin. Then, the phase-shifted full-bridge converter operates with the maximum power point tracking in the determined operation mode.

The four operation modes are described in detail below.

It should be noted that the second operation mode is generally set as the initial mode. In the second operation mode, the switching frequency is variable and is negatively correlated with the inputted current, and the phase angle is constant.

The switch transistor in the rear bridge arm is switched off with ZCS, and the phase angle Tps/T remains constant at a. The switching period T or the switching frequency f is calculated from the above expressions, so as to regulate the current Iin inputted to the phase-shift full-bridge converter, that is, power Pin inputted to the phase-shift full-bridge converter.

Figure 3:
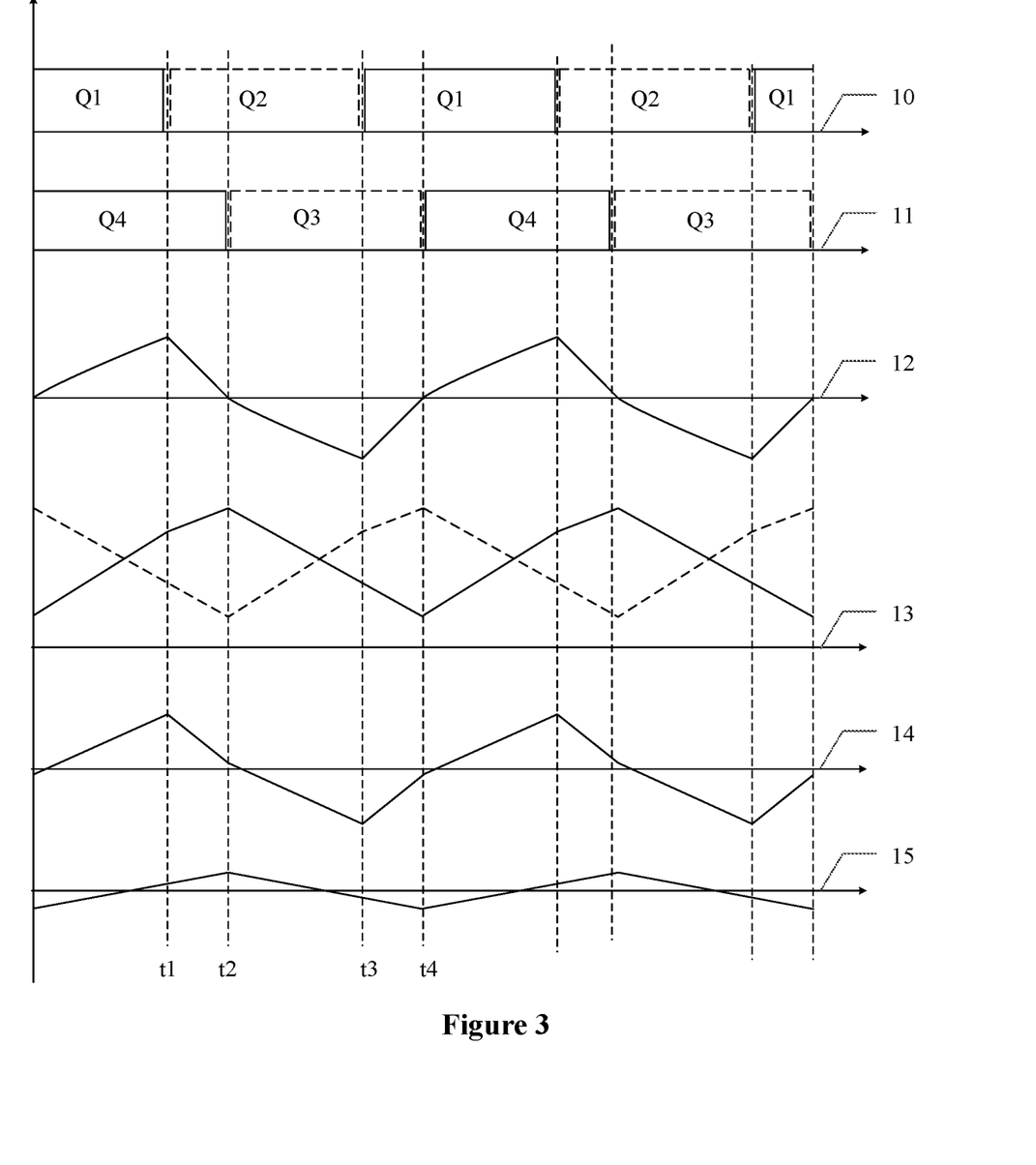
FIG. 3 is a diagram illustrating waveforms for the phase-shifted full-bridge converter to operate in a second mode according to an embodiment of the present disclosure.

FIG. 3 is a diagram illustrating waveforms for the phase-shifted full-bridge converter to operate in the second operation mode according to an embodiment of the present disclosure. FIG. 3 illustrates waveforms of driving signals PWM_Q1 to PWM_Q4 (denoted by 10 and 11) for the switch transistors in the primary full-bridge circuit, a current 12 flowing through the primary winding of the transformer, a voltage 13 across the capacitor connected to the secondary winding of the transformer, a current 14 flowing through the leakage inductor at the primary winding of the transformer, and a current 15 flowing through the excitation inductor at the primary winding of the transformer. One cycle is divided into four intervals.

From t0 to t1, the first switch transistor Q1 and the fourth switch transistor Q4 are switched on at t0. The current flowing through the primary winding of transformer increases from zero, so as to supply power to the secondary winding until t1. The first diode D1 connected to the secondary winding is cut off. The second diode D2 connected to the secondary winding is on. The first capacitor C1 discharges electricity, and the second capacitor C2 is charged.

From t1 to t2, the first switch transistor Q1 is switched off at t1. The leakage inductor Lr at the primary winding supplies power to the secondary winding of the transformer through the primary winding of the transformer, and the bulk diodes of the fourth switch transistor Q4 and the second switch transistor Q2 until t2. The second switch transistor Q2 is switched on with zero voltage switching.

From t2 to t4 the current flowing through the primary winding of the transformer decreases to zero at t2, the current flowing through the leakage inductor Lr and the excitation inductor Lm that are connected in series decreases to a minimum, and therefore is negligible. The fourth switch transistor Q4 is switched off with zero current switching. Then the third switch transistor Q3 is switch on. Then the next half cycle performs until t4 and operations are similar to the intervals from t0 to t2.

The switch transistor in the rear bridge arm can be switched off with the zero current switching by following the above control strategy, thereby reducing switching loss when switching off the switch transistor. The transmission efficiency can be improved. Moreover, a quantitative relationship between the phase angle and the switching frequency is obtained with the switch transistor in the rear bridge arm is switched off with the zero current switching, thereby controlling the phase angle and the switching frequency coordinately.

In the maximum power point tracking, the voltage Vin inputted to the phase-shifted full-bridge converter and the voltage Vout outputted by the phase-shifted full-bridge converter are constant at a certain power point, and therefore the current Vin inputted to the phase-shifted full-bridge converter may be related to the switching period T or the period of time Tps, i.e., $Iin=Iin2(T)=Iin2(Tps/\alpha)$, where $Tps=t*\alpha$.

A maximum current that can be acquired in the second operation mode is expressed as $Iin\_max2=Iin2(Tmax)$. Tmax represents the maximum switching period, i.e., a reciprocal of the minimum switching frequency. Generally, the minimum switching frequency is equal to the resonance frequency. $Iin\_max2$ is set to the first current threshold.

A minimum current that can be acquired in the second operation mode is expressed as $Iin\_min2=Iin2(Tmin)$. Tmin represents the minimum switching period, i.e., a reciprocal of the maximum switching frequency. $Iin\_min2$ is set to the second current threshold.

The minimum switching frequency (corresponding to the maximum switching period Tmax) for the converter to operate approximates to the resonance frequency. In a case that currently inputted current is still less than a desired current when the converter operates in the second operation mode and the switching frequency is minimum, the phase angle is further decreased to increase the period of time Ton and thence the inputted current until the phase angle is decreased to zero, where the inputted current Iin reaches the maximum.

In the first operation mode, the switching frequency is the minimum, and the phase angle is variable and is negatively correlated with the currently inputted current. The inputted current Iin increases by decreasing the phase angle, so as to obtain the desired power.

Figure 4:
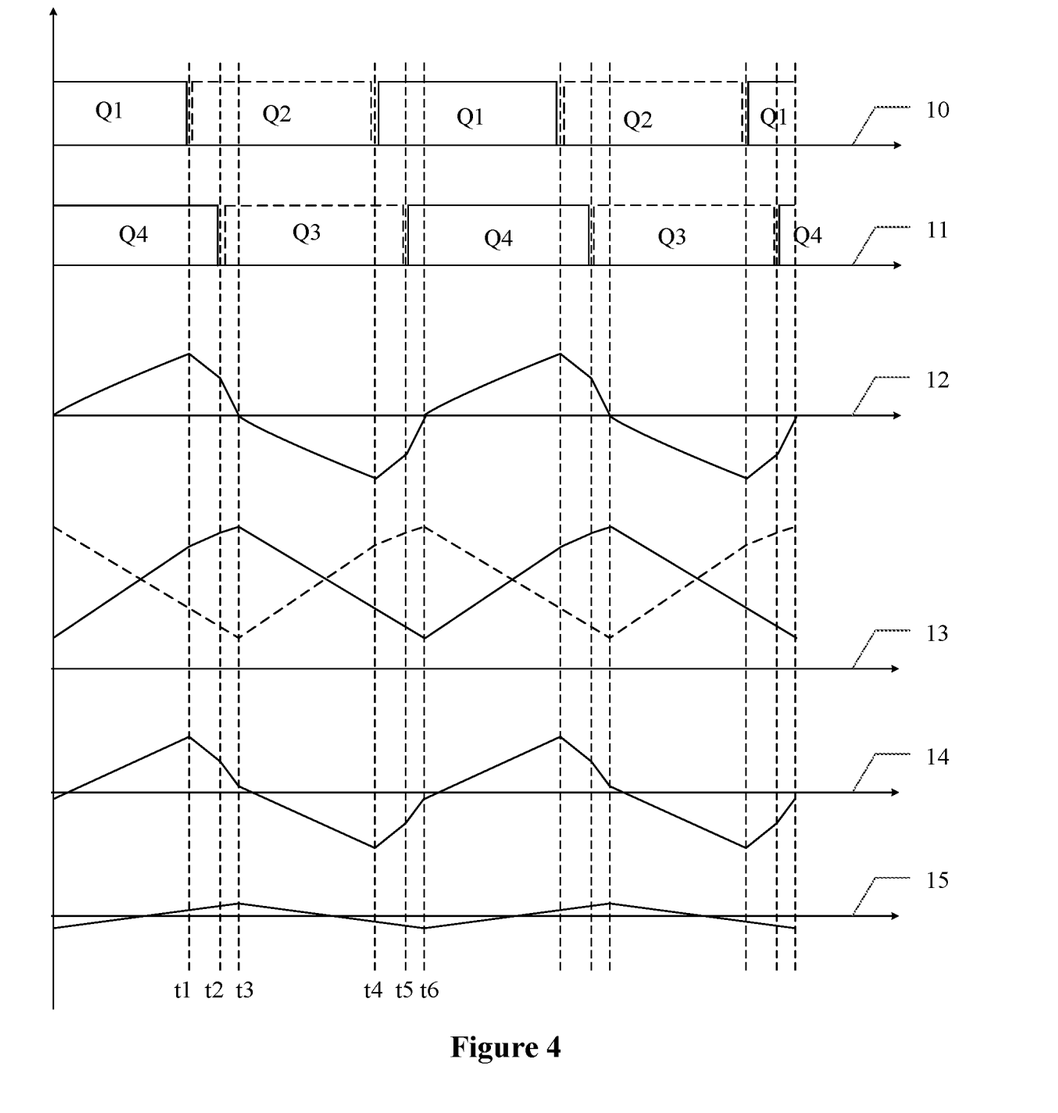
FIG. 4 is a diagram illustrating waveforms for the phase-shifted full-bridge converter to operate in a first mode according to an embodiment of the present disclosure.

FIG. 4 is a diagram illustrating waveforms for the phase-shifted full-bridge converter to operate in the first operation mode according to an embodiment of the present disclosure. FIG. 4 illustrates waveforms of driving signals PWM_Q1 to PWM_Q4 (denoted by 10 and 11) for the switch transistors in the primary full-bridge circuit, a current 12 flowing through the primary winding of the transformer, a voltage 13 across the capacitor connected to the secondary winding of the transformer, a current 14 flowing through the leakage inductor at the primary winding of the transformer, and a current 15 flowing through the excitation inductor at the primary winding of the transformer. Each cycle is divided into six intervals.

From t0 to t1, the first switch transistor Q1 and the fourth switch transistor Q4 are switched on at to. A current flowing through the primary winding of the transformer increases from zero to supply power to the secondary winding until t1. The first diode D1 connected to the secondary winding is cut off. The second diode D2 connected to the secondary winding is on. The first capacitor C1 discharges electricity, and the second capacitor C2 is charged.

From t1 to t2, the first switch transistor Q1 is switched off at t1. The leakage inductor Lr at the primary winding supplies power to the secondary winding of the transformer through the primary winding of the transformer, and the bulk diodes of the fourth switch transistor Q4 and the second switch transistor Q2 until t2. The second switch transistor Q2 is switched on with zero voltage switching.

From t2 to t3, the fourth switch transistor Q4 is switched off at t2 although the current following through the primary winding of the transformer does not decrease to zero. Then the third switch transistor Q3 is switched on, and the phase shift occurs for the full-bridge circuit of the converter. The current flowing through the primary winding of the transformer decreases rapidly rather than change suddenly due to the inputted voltage.

From t3 to t6, the current following through the primary winding of the transformer decreases to zero at t3. Then the next half cycle performs until t6 and operations are similar to the intervals from t0 to t3.

The maximum inputted current corresponding to the minimum switching frequency is expressed as $Iin\_max\_zcs=Iin(Vin, Vout, Tps\_zcs/T, Tmax)$ while the switch transistor in the rear bridge arm is switched off with the zero current switching.

While the switch transistor in the rear bridge arm is switched off with the zero current switching, Ton under the minimum switching frequency is expressed as $Ton\_zcs=ton(Vout/Vin, Tmax)=T/2-Tps\_zcs$.

The phase angle is further decreased to increase Ton in order to increase the inputted current until the inputted current reaches the desired current Iin, which is expressed as $Iin=Iin1(Vout,Tps/T,Tmax)$. Tps is expressed as $Tps=(t2-t1)=T/2-Ton=tps(Vout/Vin, Lr, Lm, n, T)$.

When the phase angle decreases to a minimum of zero, Ton reaches a maximum of T/2, and the inputted current reaches the maximum most likely. In the maximum power point tracking, Vin and Vout are constant and T is also constant at Tmax at a certain power point, and therefore the current Iin at this point is related to Tps only, that is, $Iin=Iin1(Tps)$, where $0<Tps<Tps\_zcs$. $Tps\_zcs$ is expressed as $Tps\_zcs=tps(Vout/Vin, Lr, Lm,n,T)=tps(Tmax)$.

When the phase angle reaches the minimum of zero, the inputted current reaches the maximum, that is, $Iin\_max1=Iin1(Tps=0)$.

When the converter operates in the second operation mode and the switching frequency reaches an upper limit, the phase angle is further increased once the acquired inputted current is still greater than the desired current, so as to decrease Ton, thereby decreasing the inputted current. However, it is impossible to increase the phase angle constantly, that is, a limit on the increase in the phase angle is necessary.

In the third operation mode, the switching frequency is set to the maximum, and the phase shift angle is variable and is negatively correlated with the current currently inputted to the converter. The maximum switching frequency is preset. Ton is decreased by increasing Tps obtained from the above expressions, so as to decrease the inputted current to the desired current. Tps is limited to a maximum of Tps max.

Figure 5:
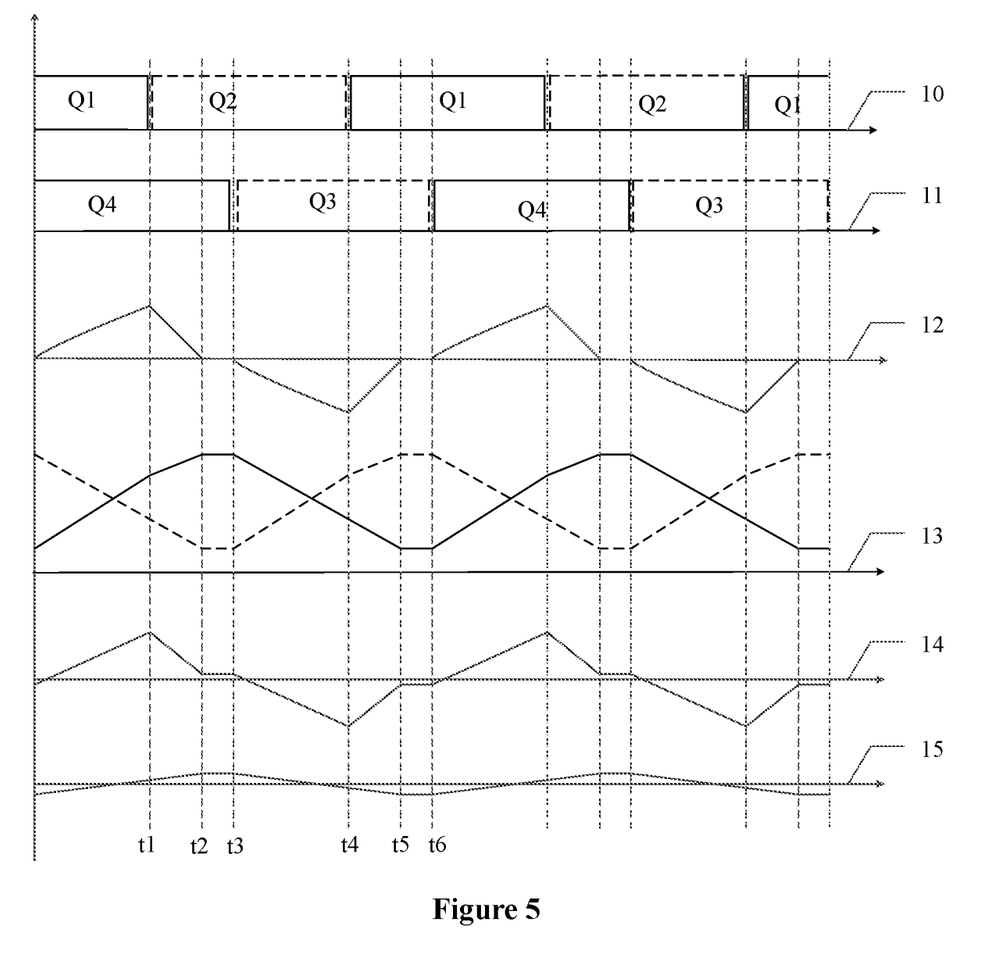
FIG. 5 is a diagram illustrating waveforms for the phase-shifted full-bridge converter to operate in a third mode according to an embodiment of the present disclosure.

FIG. 5 is a diagram illustrating waveforms for the phase-shifted full-bridge converter to operate in the third operation mode according to an embodiment of the present disclosure. FIG. 5 illustrates waveforms of driving signals PWM_Q1 to PWM_Q4 (denoted by 10 and 11) for the switch transistors of the primary full-bridge circuit, a current 12 flowing through the primary winding of the transformer, a voltage 13 across the capacitor connected the secondary winding of the transformer, a current 14 flowing through the leakage inductor at the primary winding of the transformer, and a current 15 flowing through the excitation inductor at the primary winding of the transformer. One cycle is divided into six intervals.

From t0 to t1, the first switch transistor Q1 and the fourth switch transistor Q4 are switched on at to. A current flowing through the primary winding of the transformer increases from zero to supply power to the secondary winding until t1. The first diode D1 connected to the secondary winding is cut off. The second diode D2 connected to the secondary winding is on. The first capacitor C1 discharges electricity, and the second capacitor C2 is charged.

From t1 to t21, the first switch transistor Q1 is switched off at t1. The leakage inductor Lr at the primary winding supplies power to the secondary winding of the transformer through the primary winding of the transformer, and the bulk diodes of the fourth switch transistor Q4 and the second switch transistor Q2 until t2. The second switch transistor Q2 is switched on with zero voltage switching.

From t2 to t3, the current flowing through the primary winding of the transformer decreases to zero at t2 and therefore the primary winding stops supplying power to the secondary winding. Resonance occurs on the bulk capacitors of the switch transistors on the rear bridge arm, the leakage inductor Lr of the transformer and the excitation inductor Lm of the transformer resonate until t3, resulting in negligible power. Further, the fourth switch transistor Q4 is switched off with the zero current switching in this interval.

From t3 to t6, the third switch transistor Q3 is switched on at t3. Then the next half cycle performs until t6 and operations are similar to the intervals from t0 to t3

While the switch transistor in the rear bridge arm is switched off with zero current switching, the minimum inputted current corresponding to the maximum switching frequency is expressed as: Iin_min_zcs=Iin3(Vin/Vout, Tps_zcs/T, Tmin).

While the switch transistor in the rear bridge arm is switched off with the zero current switching, the period of time Ton under the maximum switching frequency is expressed as Ton_zcs=ton(Vout/Vin, Tmin)=T/2−Tps_zcs.

The phase angle is further increased to decrease Ton in order to decrease the inputted current until the inputted current reaches the desired current Iin, which is expressed as Iin=Iin3(Vin, Vout, Tps/T, Tmin).

In the maximum power point tracking, Vin and Vout are constant and T is also constant at Tmin at a certain power point, and therefore the inputted current Iin at this point is related to Tps only, that is, Iin=Iin3(Tps). The phase angle Tps/Tmin is increased until the phase angle reaches the maximum of Tps max/Tmin, where Ton reaches the minimum, and the inputted current Iin most likely reaches the minimum of Iin_min3=Iin3(Tps=Tps max). Iin_min3 is set to the third current threshold.

In the fourth operation mode, the phase angle is constant, and the switching frequency is variable, that is, the switch transistor has an operation cycle and a nonoperation cycle depending on the inputted current. When the desired current is less than the minimum current Iin_min3 in the third operation mode, the current is decreased by interrupting the cycle. The switch transistor that is switched with ZCS is on for a Non switching periods and is off for Noff switching periods. Non and Noff depend on the inputted current Iin, that is, Iin=Iin1(Tmin)*Non/(Non+Noff).

Figure 6:
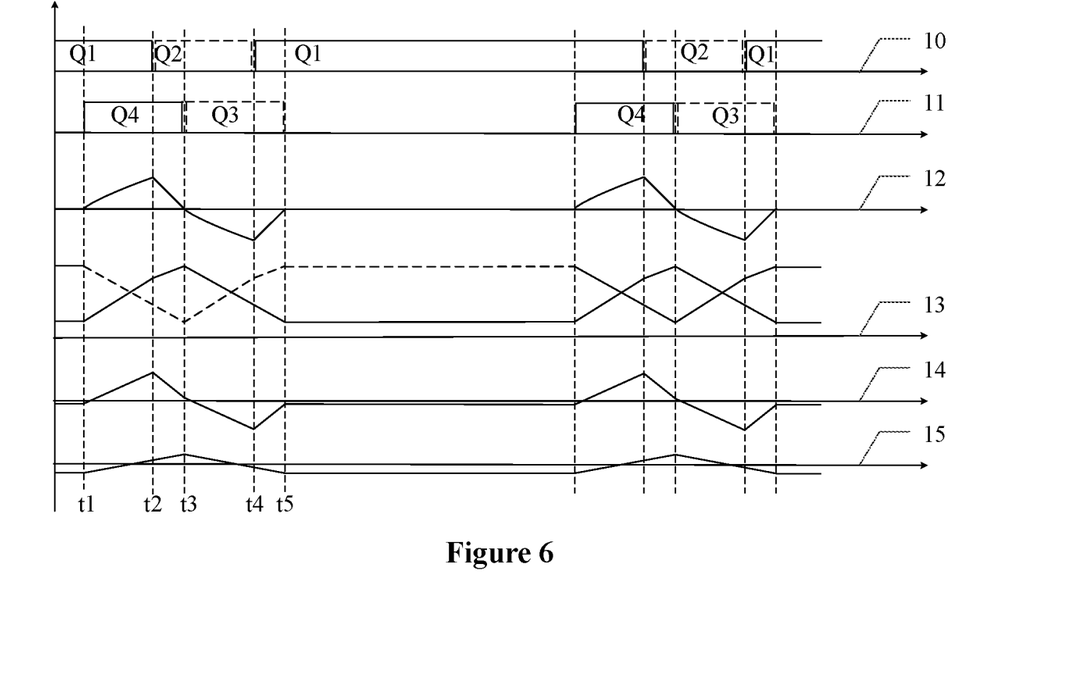
FIG. 6 is a diagram illustrating waveforms for the phase-shifted full-bridge converter to operate in a fourth mode according to an embodiment of the present disclosure.

FIG. 6 is a diagram illustrating waveforms for the phase-shifted full-bridge converter to operate in the fourth operation mode according to an embodiment of the present disclosure. FIG. 6 illustrates waveforms of driving signals PWM_Q1 to PWM_Q4 (denoted by 10 and 11) for the switch transistors of the primary full-bridge circuit, a current 12 flowing through the primary winding of the transformer, a voltage 13 across the capacitor connected to the secondary winding of the transformer, a current 14 flowing through the leakage inductor at the primary winding of the transformer, and a current 15 flowing through the excitation inductor at the primary winding of the transformer. The operation cycle is equal to the switching period of the switch transistor. For example, Non is equal to 1, and therefore the switch transistor is on for one switching period. Noff depends on the desired current Iin and Iin_min2, that is, Noff=(Iin_min2/Iin−1)*Non.

Figure 7:
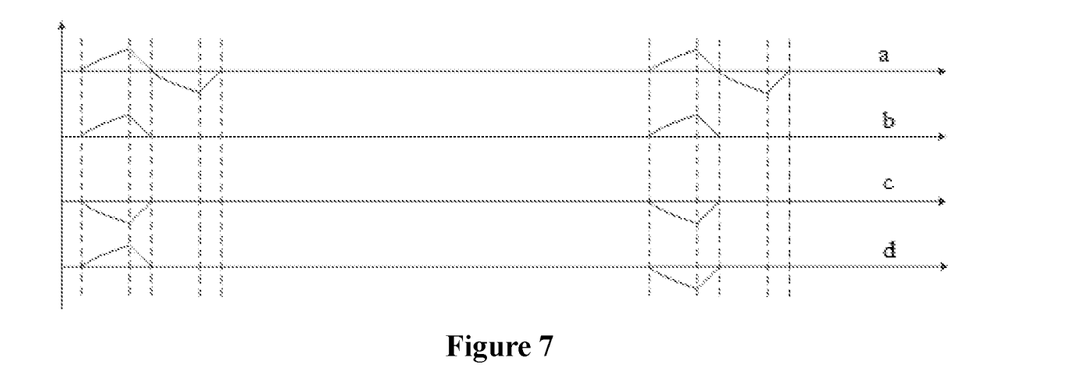
FIG. 7 is a diagram illustrating waveforms for the phase-shifted full-bridge converter to operate in the fourth mode according to another embodiment of the present disclosure.

FIG. 7 is a diagram illustrating waveforms that the phase-shifted full-bridge converter operates in the fourth operation mode according to another embodiment of the present disclosure. It should be noted that the operation cycle Non and the nonoperation cycle Noff each may be or not be an integral multiple of Ton. The operation cycle Non may last for one switching period, as denoted by a. Alternatively, the operation Non is equal to half of one switching period positively or negatively, as denoted by one of b, c and d. In a case that the operation Non is equal to half of one switching period, the nonoperation cycle is between two positive half cycles as denoted by b, or two negative half cycles as denoted by c. Alternatively, the nonoperation cycle is between a positive half cycle and a negative half cycle, as denoted by d.

With the method for controlling a phase-shift full-bridge converter according to the embodiments of the present disclosure, the current thresholds corresponding to various modes are calculated. The desired current is compared with the thresholds so as to determine an operation mode for the phase-shift full-bridge converter. The switch transistor is rapidly switched at the switching frequency, so that the photovoltaic inverter can operate stably to extract the maximum power from the photovoltaic module rapidly, thereby maximizing power generation of the photovoltaic system.

The method for controlling a phase-shifted full-bridge converter is described in detail in the above embodiments. A device for controlling a phase-shifted full-bridge converter is further provided according to an embodiment of the present disclosure. It should be noted that the device for controlling a phase-shifted full-bridge converter is described in terms of functional modules and hardware.

Figure 8:
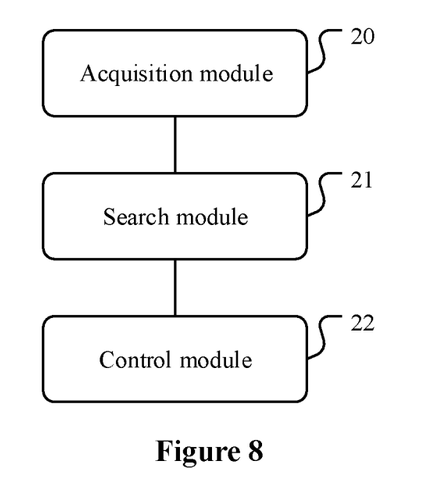
FIG. 8 is a schematic structural diagram illustrating a device for controlling the phase-shifted full-bridge converter according to an embodiment of the present disclosure.

FIG. 8 is a schematic structural diagram illustrating the device for controlling a phase-shifted full-bridge converter according to an embodiment of the present disclosure. As illustrated in FIG. 8, the device includes, in terms of functional modules, an acquisition module 20, a determination module 21 and a control module 22.

The acquisition module 20 is configured to acquire a current currently inputted to the phase-shifted full-bridge converter.

The determination module 21 is configured to search a correspondence between inputted currents and operation modes for an operation mode corresponding to the current currently inputted to the phase-shifted full-bridge converter.

The control module 22 is configured to acquire, from maximum power point tracking in the determined operation mode, a phase angle for the phase-shifted full-bridge converter and a switching frequency of a switch transistor in the phase-shifted full-bridge converter, to control the switch transistor based on the acquired phase angle and the switching frequency.

Since the device embodiment corresponds to the method embodiment, details about the device embodiment can refer to the method embodiment, and thus are not described here.

With the device for controlling a phase-shifted full-bridge converter according to the present disclosure, the current currently inputted to the phase-shifted full-bridge converter is acquired, and the correspondence between inputted currents and operation modes is searched for the operation mode corresponding to the acquired current. The phase angle for the phase-shift full-bridge converter and the switching frequency of the switch transistor in the phase-shifted full-bridge converter in the determined operation mode are determined for the purpose of maximum power point tracking. The switch transistor is controlled based on the phase angle and the switching frequency. With the above technical solutions, the switch transistor in the phase-shifted full-bridge converter can be controlled in a mode that adapts to the varying current inputted to the phase-shifted full-bridge converter. Therefore, the rapid change in the current inputted to the phase-shifted full-bridge converter can be responded timely, thereby improving efficiency and stability for the maximum power point tracking and further meeting requirements of the system.

Figure 9:
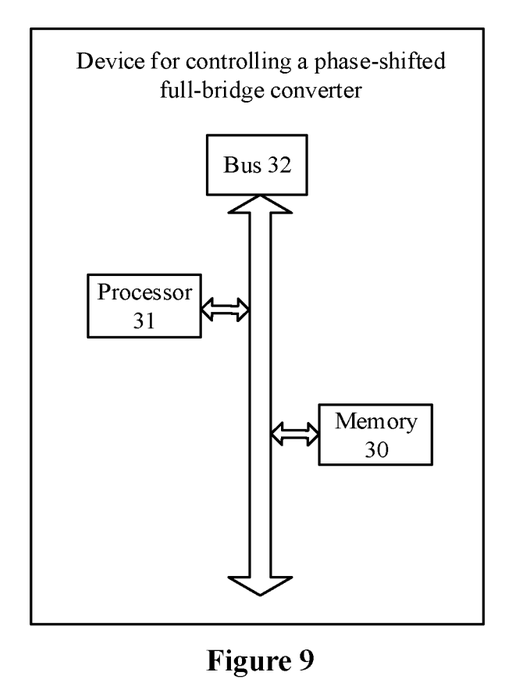
FIG. 9 is a schematic structural diagram illustrating the device for controlling the phase-shifted full-bridge converter according to another embodiment of the present disclosure.

FIG. 9 is a structural diagram illustrating the device for controlling a phase-shifted full-bridge converter according to another embodiment of the present disclosure. As illustrated in FIG. 9, the device includes, in terms of hardware, a memory 30 and a processor 31.

The memory 30 is configured to store a computer program.

The processor 31 is configured to execute the computer program to implement the method for controlling a phase-shifted full-bridge converter according to the above embodiments.

The memory 30 may include one or more computer-readable storage media. The computer-readable storage medium may be non-transient. The memory 30 may further include a high-speed random access memory and a non-volatile memory such as one or more disk storage devices and flash memory devices, for temporary storage or permanent storage. The memory 30 may be a storage unit inside a communication device in some embodiments.

The processor 31 may be a central processing unit (CPU), a controller, a microcontroller, a microprocessor or other data processing chip in some embodiments. The processor 31 is configured to execute program codes or process data stored in the memory 30, for example, to execute a program and the like corresponding to a communication method applied to a slave device.

In some embodiments, the device may further include a bus 32. The bus 32 may be a peripheral component interconnect (PCI) bus, an extended industry standard architecture (EISA) bus and the like. The bus may include an address bus, a data bus, a control bus and the like. For ease of representation, the bus in FIG. 9 is denoted by one bold line, which does not mean that there is only one bus or one type.

It should be understood by those skilled in the art that the structure shown in FIG. 9 does not intend to constitute a limitation on the communication device, and more or fewer components may be included in the communication device.

The device for controlling a phase-shift full-bridge converter according to the embodiment of the present disclosure includes the memory and the processor. The processor is configured to, when executing the computer program stored in the memory, acquire a current currently inputted to the phase-shifted full-bridge converter; search a correspondence between inputted currents and operation modes for an operation mode corresponding to the current currently inputted to the phase-shifted full-bridge converter; and acquire, for maximum power point tracking in the determined operation mode, a phase angle for the phase-shifted full-bridge converter and a switching frequency of a switch transistor in the phase-shifted full-bridge converter. With the above technical solutions, the switch transistor in the phase-shifted full-bridge converter can be controlled in a mode that adapts to the varying current inputted to the phase-shifted full-bridge converter. Therefore, the rapid change in the current inputted to the phase-shifted full-bridge converter can be responded timely, thereby improving efficiency and stability for the maximum power point tracking and further meeting requirements of the system.

A computer-readable storage medium is further provided according to an embodiment of the present disclosure. The computer-readable storage medium stores a computer program that, when executed by a processor, causes the processor to perform the method according to the above embodiments.

It should be understood that if the method in the above embodiments is implemented in a form of a software functional unit and is sold and used as an independent product, the software may be stored in a computer-readable storage medium. Base on the above understanding, the technical solutions according to the present disclosure essentially or the part that contributes to the conventional technology, or all or a part of the technical solutions may be embodied in a form of a software product. The computer software product is stored in a storage medium and performs all or part of steps of the method described in the above embodiments of the present disclosure. The storage medium includes various media that can store program codes, such as a U disk, a mobile hard disk, a read-only memory (ROM), a random access memory (RAM), a magnetic disk, or an optical disk.

Finally, a phase-shifted full-bridge converter is further provided according to the present disclosure, as illustrated in FIG. 1. The phase-shifted full-bridge converter includes the device for controlling a phase-shifted full-bridge converter according to the above embodiments, and further includes a primary full-bridge circuit, a transformer, a first inductor Lr, a second inductor Lm, a third inductor Lrs, a first diode D1, a second diode D2, a first capacitor C1 and a second capacitor C2.

A first output terminal of the primary full-bridge circuit is connected to a first terminal of the first inductor Lr. A second terminal of the first inductor Lr is connected to a first terminal of a primary winding of the transformer. A second output terminal of the primary full-bridge circuit is connected to a second terminal of the primary winding of the transformer. The second inductor Lm is connected in parallel with the primary winding of the transformer. A first terminal of a secondary winding of the transformer is connected to a first terminal of the third inductor Lrs. A second terminal of the third inductor Lrs is connected to a first terminal of the first capacitor C1 and a first terminal of the second capacitor C2. A second terminal of the first capacitor C1 is connected to a cathode of the first diode D1. An anode of the first diode D1 is connected to a cathode of the second diode D2. A second terminal of the secondary winding of the transformer is connected to the cathode of the second diode D2. An anode of the second diode D2 is connected to a second terminal of the second capacitor C2.

The phase-shifted full-bridge converter further includes a filter capacitor C0 and a load ZL.

The phase-shift full-bridge converter has described above in description of the method for controlling the phase-shifted full-bridge converter, and therefore is not described in detail here.

With the phase-shifted full-bridge converter according to the embodiment of the present disclosure, the current currently inputted to the phase-shifted full-bridge converter is acquired, and the correspondence between inputted currents and operation modes is searched for the operation mode corresponding to the acquired current. The phase angle for the phase-shift full-bridge converter and the switching frequency of the switch transistor in the phase-shifted full-bridge converter in the determined operation mode are determined for the purpose of maximum power point tracking. The switch transistor is controlled based on the phase angle and the switching frequency. With the above technical solutions, the switch transistor in the phase-shifted full-bridge converter can be controlled in a mode that adapts to the varying current inputted to the phase-shifted full-bridge converter. Therefore, the rapid change in the current inputted to the phase-shifted full-bridge converter can be responded timely, thereby improving efficiency and stability for the maximum power point tracking and further meeting requirements of the system.

The phase-shifted full-bridge converter, the method and device for controlling the phase-shifted full-bridge converter, and the medium according to the present disclosure are described in detail above. The embodiments of the present disclosure are described in a progressive manner, each embodiment focuses on differences from other embodiments, and the same or similar parts between the various embodiments may be referred to each other. Since the devices disclosed in the embodiment corresponds to the method disclosed in the embodiment, the description for the device is simple, and reference may be made to the method embodiments for the relevant parts. It should be noted that, various modifications and improvements may be made to the present disclosure by those skilled in the art without departing from the principle of the present disclosure, and these modifications and improvements are also fall into the protection scope of the present disclosure.

It should also be noted that in the specification, relational terms such as "first", "second" and the like are merely used for distinguishing one entity or operation from another, rather than indicating or implying an actual relationship or order of these entities or operations. Furthermore, terms "include", "comprise" or any other variants thereof are intended to be non-exclusive. Therefore, a process, method, article or device including a series of elements includes not only the elements but also other elements that are not enumerated or other elements inherent to the process, method, article or device. Unless expressively limited otherwise, a process, method, article or device limited by "comprising/including a(n) . . . " does not exclude existence of another identical element in the process, method, article or device.

The invention claimed is:

1. A method for controlling a phase-shifted full-bridge converter, comprising:
　　acquiring a current currently inputted to the phase-shifted full-bridge converter;
　　determining, based on a correspondence between inputted currents and operation modes, an operation mode corresponding to the current currently inputted to the phase-shifted full-bridge converter; and
　　acquiring, from maximum power point tracking in the determined operation mode, a phase angle for the phase-shifted full-bridge converter and a switching frequency of a switch transistor in the phase-shifted full-bridge converter, to control the switch transistor to operate based on the phase angle and the switching frequency;
　　wherein the determining, based on a correspondence between inputted currents and operation modes, an operation mode corresponding to the current currently inputted to the phase-shifted full-bridge converter comprises:
　　controlling, in a case that the current currently inputted to the phase-shifted full-bridge converter is greater than a first current threshold, the switch transistor to operate in a first operation mode;
　　controlling, in a case that the current currently inputted to the phase-shifted full-bridge converter is greater than a second current threshold and less than the first current threshold, the switch transistor to operate in a second operation mode;
　　controlling, in a case that the current currently inputted to the phase-shifted full-bridge converter is greater than a third current threshold and less than the second current threshold, the switch transistor to operate in a third operation mode; and
　　controlling, in a case that the current currently inputted to the phase-shifted full-bridge converter is less than the third current threshold, the switch transistor to operate in a fourth operation mode.

2. The method for controlling a phase-shifted full-bridge converter according to claim 1, wherein
　　the first current threshold depends on a preset minimum switching frequency;
　　the second current threshold depends on a preset maximum switching frequency; and
　　the third current threshold depends on the preset maximum switching frequency and a preset maximum phase angle.

3. The method for controlling a phase-shifted full-bridge converter according to claim 2, wherein
　　in the first operation mode, the switching frequency is equal to the minimum switching frequency, and the phase angle is negatively correlated with the current currently inputted to the phase-shifted full-bridge converter;
　　in the second operation mode, the phase angle is constant, and the switching frequency is negatively correlated with the current currently inputted to the phase-shifted full-bridge converter;
　　in the third operation mode, the switching frequency is equal to the maximum switching frequency, and the phase angle is negatively correlated with the current currently inputted to the phase-shifted full-bridge converter; and
　　in the fourth operation mode, the phase angle is constant, and the switch transistor has an operation cycle and a nonoperation cycle, wherein the operation cycle and the nonoperation cycle depend on the current currently inputted to the phase-shifted full-bridge converter.

4. The method for controlling a phase-shifted full-bridge converter according to claim 3, wherein in the fourth operation mode, the operation cycle is equal to an entire switching period of the switch transistor.

5. The method for controlling a phase-shifted full-bridge converter according to claim 1, further comprising:
　　controlling, in response to a starting instruction, two switch transistors on a front bridge arm of the phase-shift full-bridge converter to be switched on alternately; and
　　controlling, in response to the starting instruction, two switch transistors on a rear bridge arm of the phase-shift full-bridge converter to be switched on alternately.

6. A device for controlling a phase-shifted full-bridge converter, comprising:
　　a memory configured to store a computer program; and
　　a processor configured to execute the computer program to implement the method for controlling the phase-shifted full-bridge converter according to claim 1.

7. A computer-readable storage medium storing a computer program that, when being executed by a processor, implements the method for controlling the phase-shifted full-bridge converter according to claim 1.

8. A phase-shifted full-bridge converter, comprising:
the device for controlling the phase-shifted full-bridge converter according to claim 6;
a primary full-bridge circuit;
a transformer;
a first inductor;
a second inductor;
a third inductor;
a first diode;
a second diode;
a first capacitor; and
a second capacitor, wherein
a first output terminal of the primary full-bridge circuit is connected to a first terminal of the first inductor, a second terminal of the first inductor is connected to a first terminal of a primary winding of the transformer, a second output terminal of the primary full-bridge circuit is connected to a second terminal of the primary winding of the transformer, the second inductor is connected in parallel with the primary winding of the transformer, a first terminal of a secondary winding of the transformer is connected to a first terminal of the third inductor, a second terminal of the third inductor is connected to a first terminal of the first capacitor and a first terminal of the second capacitor, a second terminal of the first capacitor is connected to a cathode of the first diode, an anode of the first diode is connected to a cathode of the second diode, a second terminal of the secondary winding of the transformer is connected to the cathode of the second diode, and an anode of the second diode is connected to a second terminal of the second capacitor.

9. A device for controlling a phase-shifted full-bridge converter, comprising:

an acquisition module configured to acquire a current currently inputted to the phase-shifted full-bridge converter;
a determination module configured to determine, based on a correspondence between inputted currents and operation modes, an operation mode corresponding to the current currently inputted to the phase-shifted full-bridge converter; and
a control module configured to acquire, from maximum power point tracking in the determined operation mode, a phase angle for the phase-shifted full-bridge converter and a switching frequency of a switch transistor in the phase-shifted full-bridge converter, to control the switch transistor based on the phase angle and the switching frequency;
wherein the determination module is further configured to:
control, in a case that the current currently inputted to the phase-shifted full-bridge converter is greater than a first current threshold, the switch transistor to operate in a first operation mode;
control, in a case that the current currently inputted to the phase-shifted full-bridge converter is greater than a second current threshold and less than the first current threshold, the switch transistor to operate in a second operation mode;
control, in a case that the current currently inputted to the phase-shifted full-bridge converter is greater than a third current threshold and less than the second current threshold, the switch transistor to operate in a third operation mode; and
control, in a case that the current currently inputted to the phase-shifted full-bridge converter is less than the third current threshold, the switch transistor to operate in a fourth operation mode.

\* \* \* \* \*